May 24, 1966  C. G. MATTHEWS  3,252,569
PLASTIC COATED LAMINATED NAIL
Filed Jan. 29, 1963
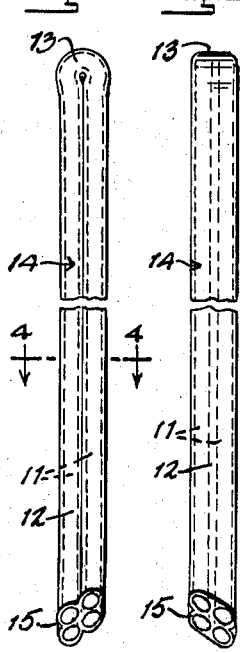
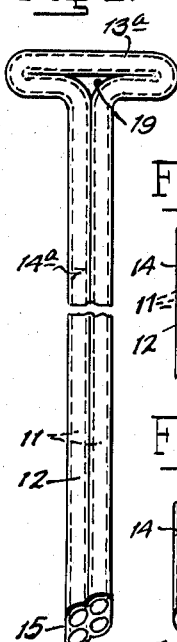
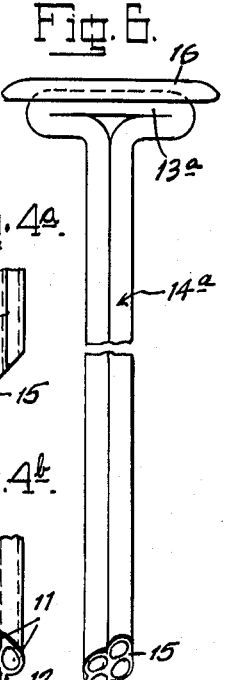
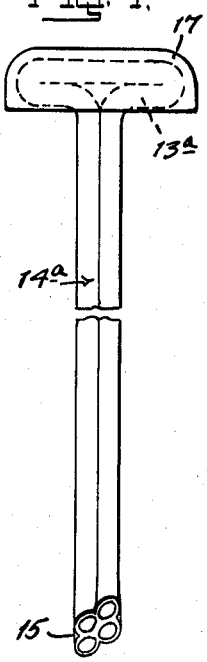
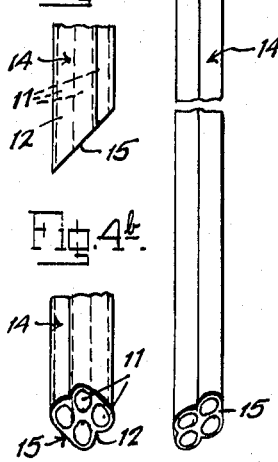
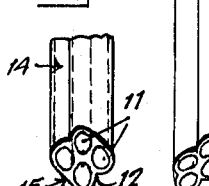
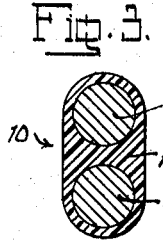
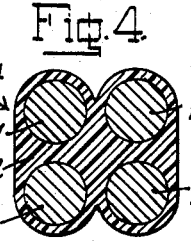
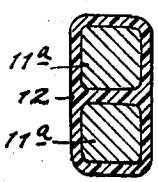
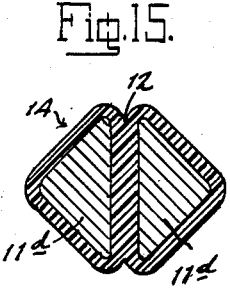
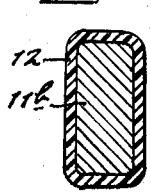
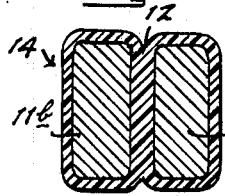
INVENTOR.
CYRIL G. MATTHEWS.
BY
ATTORNEY.

United States Patent Office 3,252,569
Patented May 24, 1966

3,252,569
PLASTIC COATED LAMINATED NAIL
Cyril G. Matthews, Teaneck, N.J., assignor to Plasti-Clad Metal Products, Inc., Teaneck, N.J., a corporation of New Jersey
Filed Jan. 29, 1963, Ser. No. 254,795
9 Claims. (Cl. 206—56)

This application is a continuation-in-part of application Serial No. 773,854 filed November 14, 1958, now Patent No. 3,076,373 granted February 5, 1963. The present invention relates to a plastic coated laminated nail, and has for an object to provide a nail of this character which may be economically formed, as for instance by conventional wire bending or forming apparatus, from a filament consisting of a body of thermoplastic material, for example nylon, encasing a reinforcing metallic wire core, for example of steel. A further object is to provide a nail which may be produced in a variety of colors and having the advantages of increased holding power, easier penetration, freedom from corrosion, and increased columnar strength over conventional coated or uncoated wire nails heretofore in use.

It is proposed according to the invention to provide a nail in which the head is in the form of a bend of the filament material, whereby an unbroken thermoplastic coating is provided over the head, as distinguished from a head produced by the conventional nail heading operation which in the case of coated material would break the coating and expose the base metal to corrosion. It is further proposed to provide the shank of the nail in the form of laminations of thermoplastic material and metal extending lengthwise of the shank produced by bending a length of filament upon itself and thereupon bonding or fusing the contacting surfaces of the thermoplastic body together. A laminated shank is thus provided having at least a pair of laterally spaced metallic cores encased in a thermoplastic body and separated by bonded or fused laminations of the thermoplastic body, so that upon driving of the nail the wire cores are permitted by virtue of the compressibility of the thermoplastic body to be pressed toward each other, with the result that the thermoplastic material between the wire cores is laterally displaced into firm engagement with the wall of the hole produced in the material being nailed.

A further object is to provide a thermoplastic coated nail in which the thermoplastic material, for example nylon, is bonded to the core wires and is externally shaped by passage through suitable extrusion dies to provide the desired cross-sectional shape, the resultant coating being linearly oriented, and having cold flow properties and an elastic memory recovery factor. Thermoplastic materials of this type have long chain-like molecules which in the mass of material prior to extrusion have a haphazard arrangement like the straws in a hay stack. However, when subjected to the drawing pressure of extrusion the long chain molecules become oriented, taking on an orderly arrangement in parallel relation to the extrusion axis, with the result that the extrusion has an increased tensile and columnar strength. As a result of these properties the thermoplastic material displaced or deformed through the compressive movement of the wire cores during driving of the nail tends to recover its original form, thereby continuously creating outward pressure upon the wire cores. The holding power of the nail thus increases with the passage of time, despite shrinkage, drying, or other physical changes which may take place in the wood or other material into which the nail is driven.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:
FIG. 1 is a front elevation of a nail according to one embodiment of the invention;
FIG. 2 is a side view thereof;
FIG. 3 is a cross-sectional view on an enlarged scale of the filament from which the nail of FIGS. 1 and 2 is formed;
FIG. 4 is a cross-sectional view on an enlarged scale taken along the line 4—4 of FIG. 1;
FIG. 4a is an elevation of the point end of the nail turned 45° clockwise from the position as seen in FIG. 1;
FIG. 4b is a similar view showing the nail turned 90° counter-clockwise from the position as seen in FIG. 4a;
FIG. 5 is a front elevation of a nail according to a modified embodiment of the invention;
FIG. 6 is a front elevation of another modified embodiment having a supplemental adhered head;
FIG. 7 is a front elevation of still another modified embodiment having a supplemental molded head;
FIG. 8 is a cross-sectional view of a modified form of filament;
FIG. 9 is a cross-sectional view similar to FIG. 4 of a nail formed of the filament of FIG. 8;
FIG. 10 is a cross-sectional view of another modified form of filament;
FIG. 11 is a cross-sectional view like FIG. 4 of a nail formed of the filament of FIG. 10;
FIG. 12 is a cross-sectional view of another modified form of filament of semi-circular cross-section;
FIG. 13 is a cross-sectional view similar to FIG. 4 of a nail formed of the filament of FIG. 12;
FIG. 14 is a cross-sectional view of still another modified form of filament of triangular cross-section;
FIG. 15 is a cross-sectional view similar to FIG. 4 of a nail formed of the filament of FIG. 14; and
FIG. 16 is a perspective view showing a series of nails according to the embodiment of FIG. 5, with means connecting them together for packaging or magazine loading.

Referring to the drawings, the nail according to the invention is formed from a length of filament 10 as seen in cross-section in FIG. 3 comprising a pair of spaced reinforcing parallel wire core members 11—11 of suitable metal, for example tempered medium or high carbon steel, and of circular or other suitable cross-section, and which are encased within a thermoplastic body 12, preferably nylon. The thermoplastic material is bonded to the wire core members and is externally shaped by passage through suitable extrusion dies. In the process of extrusion the thermoplastic material is molecularly oriented to give it increased tensile strength in the linear direction of the filament, as well as to effect a firm bond with the reinforcing wires. The cross-sectional shape in the case of the circular cross-sectional wires as seen in FIG. 3 is such that the narrow edges of the filament are rounded in concentric relation to the outer surfaces of the wires to provide a coating of uniform thickness over these outer surfaces, while the wide side surfaces are flat and tangential to the rounded edge surfaces with the intervening thermoplastic material filling the space between the wire core members.

Referring particularly to FIGS. 1 and 2 the nail according to the embodiment of the invention shown therein comprises a head 13 formed by bending a straight length of filament centrally upon itself, the bending axis being parallel to the wide side surfaces of the filament, the equal length legs thus formed at each side of the bend being brought together under tension and integrally bonded or fused through the application of heat to form the nail shank 14. In practice the nail with the two sides of the shank brought together under tension are passed by suitable conveyor means through a heating zone. The end of the shank 14 is preferably provided with a beveled point 15 presenting a diamond shaped face in which the bevel cut end of one of the core members 11 is disposed within the angle of the V-shaped lower edge.

The nail as seen in FIGS. 1 and 2 is comparable in its general shape and use to a finishing nail, the head 13 in the form of a bend or bight being adapted for driving and countersinking in the manner of the head of a conventional finishing nail. The thermoplastic coating of the head protects the exposed end of the driven nail against corrosion, and in the case of colored thermoplastic material may provide desired decorative values. The laminated form of the shank consisting of longitudinally extending laminations of metal and thermoplastic material is such that the stiffness or driving strength is materially increased over that of a conventional nail, and additionally has the unique property of allowing the metal laminations to compress as the nail is driven into wood or similar material causing the thermoplastic material to be displaced outwardly into firm engagement with the walls of the hole produced by the penetration of the nail. The elastic memory of the thermoplastic material is such that it does not remain static following the driving of the nail, but tends to recover its original shape with the result that the metal reinforcing wires are pressed outwardly to increase the holding power of the nail.

Referring to FIG. 5, the nail according to the modified embodiment of the invention shown therein has a flattened head 13a which may be produced in a conventional wire bending machine and which with the shank 14a provides a T-shaped nail, the head including a straight bridge portion having portions bent inwardly beneath it, and from which the leg portions are bent downwardly to form the shank.

In FIG. 6 there is shown a modification in which the T-shaped nail as seen in FIG. 5 is provided with a supplemental head 16 of circular or other suitable shape and formed of a suitable material capable of bonding or fusing with the thermoplastic material of the nail, for example nylon, acrylic resin, or the like. The supplemental head may be slightly recessed as shown, or the head 13a may be slightly pressed into the under side of the supplemental head 16 during the bonding or fusing operation.

In FIG. 7 there is shown a modification in which a supplemental head 17 of suitable thermoplastic material is molded about the head 13a.

In FIGS. 8 and 9 there is shown a modified form of filament in which the reinforcing wire core members 11a are of square cross-section with rounded corners. In FIGS. 10 and 11 there is shown a modified filament in which a single reinforcing wire or core member 11b is provided of rectangular cross-section with rounded corners. In FIGS. 12 and 13 there is shown a modified filament in which a single reinforcing wire core member 11c of substantially semi-circular cross-section is provided, the resultant shank of the nail being circular as seen in FIG. 13. In FIGS. 14 and 15 there is shown a modified filament in which a single reinforcing wire core member 11d of triangular cross-section is provided, the resultant shank of the nail being substantially square.

In FIG. 16 there is shown a series of nails of the type shown in FIG. 5 connected together for packaging or magazine loading in nailing machines. A cord like strip 18 is engaged through the small aperture 19 formed in the head through the bending of the shank from the head. Preferably this cord is of nylon or other suitable thermoplastic material which may be bonded or fused by the application of heat to the nails, and which lends itself to severing at the surface of the individual nails through pressure applied to the end of the nail by the usual driver of a nailing machine.

What is claimed is:

1. A plastic coated laminated nail comprising a length of filament having a reinforcing metallic wire core and a thermoplastic body entirely surrounding and encasing said core, said length of filament having a bent formation substantially centrally of its length providing an entirely coated driving head and having leg portions extending from said bent formation in contacting facing relation to each other providing a coated shank which is a laminated composite of said leg portions disposed in driving alignment with said head, the opposed portions of the thermoplastic body along said leg portions being homogeneously adhered together to provide a mass of thermoplastic material between the core portions of said leg portions constituting the sum of the opposed coating portions of said leg portions.

2. A plastic coated laminated nail as defined in claim 1, wherein the end of said shank opposite said driving head terminates in an inclined surface having its lowermost point in one leg portion adjacent one side edge thereof and its uppermost point in the other leg portion adjacent the opposite side edge thereof from said one side edge of said one leg portion.

3. A plastic coated laminated nail as defined in claim 1, wherein said thermoplastic body is nylon.

4. A plastic coated laminated nail as defined in claim 1, wherein said thermoplastic body is a linearly oriented thermoplastic material having cold flow properties and an elastic memory factor.

5. The invention as defined in claim 1 wherein said bent formation is of T-form and includes a straight bridge portion providing an upwardly disposed entirely coated head and portions bent inwardly beneath said bridge portion from which said leg portions extend downwardly.

6. A nail strip comprising a series of nails as defined in claim 5, wherein said T-formation of each of said nails has an aperture centrally beneath said straight bridge portion, and wherein a thermoplastic cord is engaged through the apertures of said series of nails and is adhered to said plastic bodies of said nails.

7. A plastic coated laminated nail as defined in claim 1, wherein said filament is of greater width than thickness with wide sides of said leg portions in facing relation.

8. A plastic coated laminated nail as defined in claim 7, wherein said reinforcing metallic core of said filament comprises a pair of spaced parallel metallic wires.

9. A plastic coated laminated nail as defined in claim 7 wherein said reinforcing metallic core of said filament comprises a metallic wire of greater width than thickness.

References Cited by the Examiner

UNITED STATES PATENTS

| 1,026,050 | 5/1912 | Reber | 85—17 |
| 2,232,994 | 2/1941 | Bernstein | 1—56 |
| 2,939,147 | 6/1960 | Jacobson | 1—56 |
| 3,009,382 | 11/1961 | Salka | 85—28 |
| 3,076,373 | 2/1963 | Matthews | 85—23 |

FOREIGN PATENTS

| 1,020,232 | 11/1952 | France. |
| 725,631 | 3/1955 | Great Britain. |

CARL W. TOMLIN, *Primary Examiner.*

EDWARD C. ALLEN, *Examiner.*

M. PARSONS, JR., *Assistant Examiner.*